United States Patent
Riggen et al.

(10) Patent No.: US 9,586,389 B2
(45) Date of Patent: Mar. 7, 2017

(54) CARBON FIBER WRENCH ASSEMBLY WITH INSERT

(71) Applicant: BurnTables LLC, Hutto, TX (US)

(72) Inventors: Kyle Riggen, Leander, TX (US); Matt Kool, Austin, TX (US)

(73) Assignee: BurnTables LLC, Hutto, TX (US)

( * ) Notice: Subject to any disclaimer, the term of this patent is extended or adjusted under 35 U.S.C. 154(b) by 321 days.

(21) Appl. No.: 14/510,856

(22) Filed: Oct. 9, 2014

(65) Prior Publication Data
US 2015/0101459 A1    Apr. 16, 2015

Related U.S. Application Data

(60) Provisional application No. 61/889,345, filed on Oct. 10, 2013.

(51) Int. Cl.
| | |
|---|---|
| B25B 23/00 | (2006.01) |
| B32B 37/14 | (2006.01) |
| B32B 37/18 | (2006.01) |
| B25B 13/04 | (2006.01) |
| B25B 13/56 | (2006.01) |
| B29C 70/86 | (2006.01) |
| B29L 31/28 | (2006.01) |

(52) U.S. Cl.
CPC .............. *B32B 37/18* (2013.01); *B25B 13/04* (2013.01); *B25B 13/56* (2013.01); *B29C 70/86* (2013.01); *B29L 2031/283* (2013.01)

(58) Field of Classification Search
CPC ......... B25B 13/56; B25B 13/04; B29C 70/84; B29C 70/083; B29L 2031/283; B32B 37/18
See application file for complete search history.

(56) References Cited

U.S. PATENT DOCUMENTS

| | | | | |
|---|---|---|---|---|
| 2,720,799 | A * | 10/1955 | Pfost ...................... | B22D 19/06 164/111 |
| 3,691,000 | A * | 9/1972 | Kalnin .................... | B29C 70/04 138/174 |
| 4,992,318 | A * | 2/1991 | Gadkaree ................. | B32B 5/26 428/113 |
| 5,062,328 | A * | 11/1991 | Demurger ............... | B25B 13/08 81/185 |
| 5,271,300 | A * | 12/1993 | Zurbuchen .............. | B25B 13/00 81/124.4 |
| 5,394,773 | A * | 3/1995 | Zurbuchen .............. | B25B 13/00 428/114 |
| 5,448,932 | A * | 9/1995 | Zurbuchen .............. | B25B 13/00 81/124.4 |
| RE35,424 | E * | 1/1997 | Seals ....................... | B25B 13/56 59/7 |
| 5,713,251 | A * | 2/1998 | Zurbuchen ............ | B25B 13/463 81/61 |

(Continued)

*Primary Examiner* — David B Thomas

(74) *Attorney, Agent, or Firm* — Schwegman Lundberg & Woessner, P.A.

(57) ABSTRACT

The disclosure addresses wrenches having a portion thereof including carbon fibers. Example wrenches may have a handle portion comprising the carbon fibers; which in some cases can be formed as a part of a composite laminate structure of at least a portion of the handle. Example wrenches will often include an insert portion for engaging a bolt, nut, or similar structure. In most cases, the insert will be formed of a relatively hardened material, such as a metal, or a metal-containing, material.

16 Claims, 3 Drawing Sheets

(56) References Cited

U.S. PATENT DOCUMENTS

| | | | | |
|---|---|---|---|---|
| 5,875,693 A | * | 3/1999 | Zurbuchen | B25B 13/461 81/177.1 |
| 5,970,826 A | * | 10/1999 | Iwinski | B25B 13/06 81/124.6 |
| 6,126,882 A | * | 10/2000 | Iwinski | B25B 13/06 264/261 |
| 6,257,107 B1 | * | 7/2001 | Chang | B25B 13/465 81/467 |
| 6,318,216 B1 | * | 11/2001 | Eggert | B25B 13/04 81/124.3 |
| 2002/0011136 A1 | * | 1/2002 | Eggert | B25B 13/04 81/125.1 |
| 2003/0154829 A1 | * | 8/2003 | Lin Wu | B25B 7/00 81/177.1 |

* cited by examiner

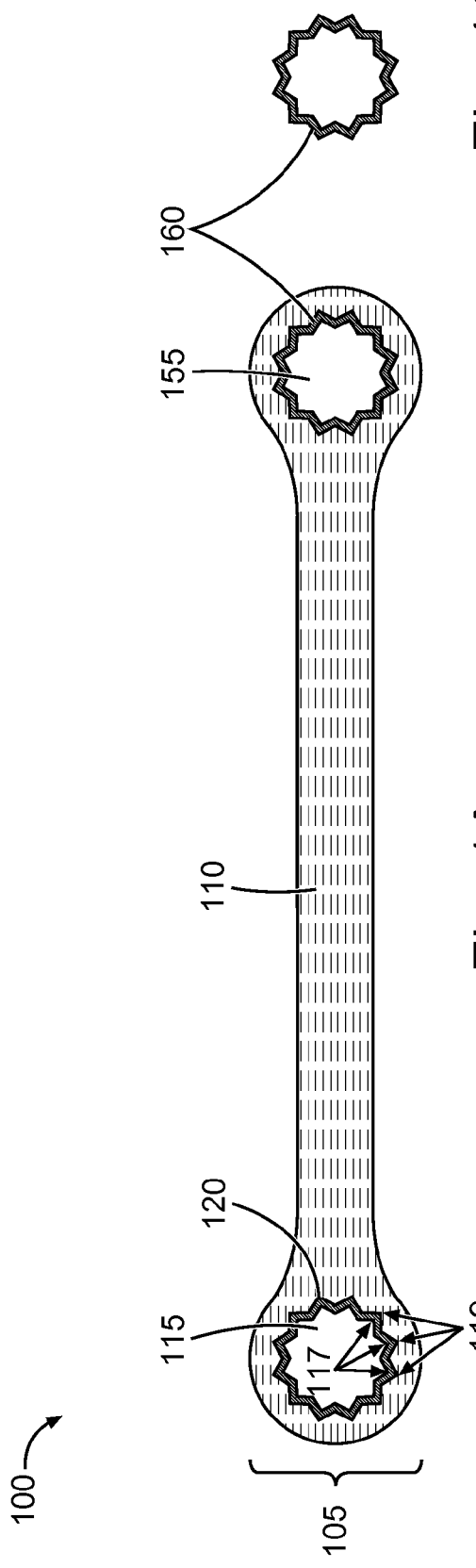
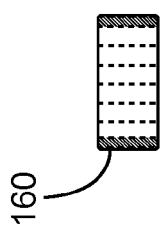
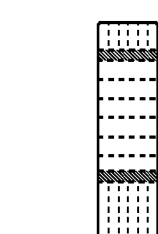
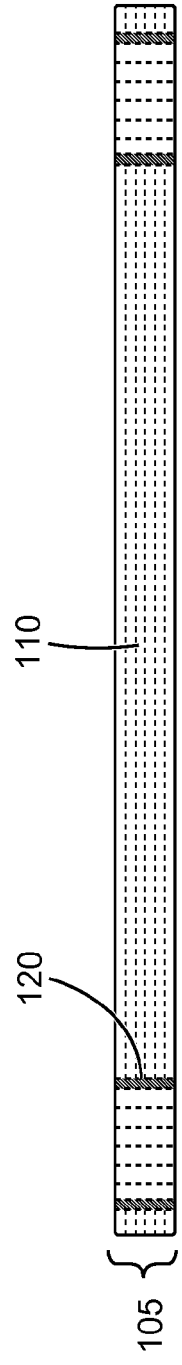
Fig. 1A
Fig. 1B
Fig. 1C
Fig. 1D

CARBON FIBER WRENCH ASSEMBLY WITH INSERT

CROSS REFERENCE TO RELATED APPLICATION

This application is a non-provisional patent application claiming priority under 35 USC §119(e) to U.S. Provisional Patent Application Ser. No. 61/889,345, filed on Oct. 10, 2013, which is incorporated herein by reference in its entirety.

BACKGROUND OF THE INVENTION

The present invention relates generally to wrenches, and particularly to wrenches including a handle portion comprising carbon fibers, and an insert portion for engaging a bolt, nut, or similar structure. The insert will be formed of a relatively hardened material, and in many examples will be formed of metal, or a metal-containing material.

Various configurations have been proposed for manufacturing wrenches with handles or other components formed of a composite material. A difficulty in such devices is providing surfaces having characteristics suitable to engage a bolt head, nut, or similar component which can be suitably coupled to a composite structure. Proposed solutions require relatively complex structures or configurations, and many are relatively undesirable for attachment to a carbon fiber structure and/or require specific manufacturing processes for use with carbon fiber.

BRIEF DESCRIPTION OF THE DRAWINGS

FIGS. 1A-D depict an example wrench in accordance with the present invention, depicted in FIG. 1A from a plan view, and depicted in FIG. 1B in vertical section along the longitudinal axis of the wrench; while FIG. 1C depicts a metallic insert of the wrench from a plan view; and FIG. 1D depicts that metallic insert in vertical section.

DETAILED DESCRIPTION OF PREFERRED EMBODIMENTS

Figure 2:
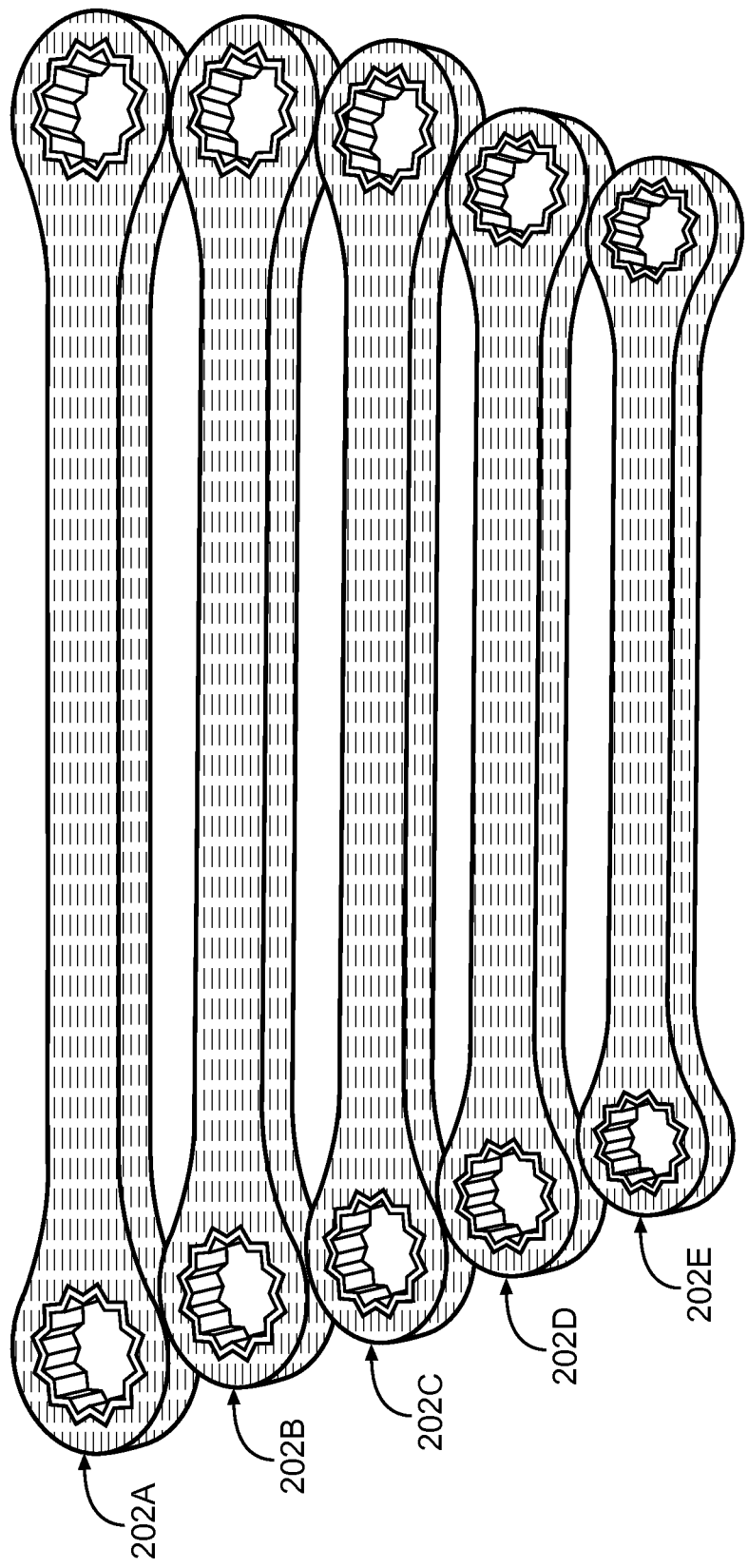
FIG. 2 depicts a set of wrenches from a perspective view, each of which is constructed in accordance with the basic description of the wrench of FIGS. 1A-D.

The example configurations of wrenches described herein are particularly adapted for formation with carbon fiber. In some particularly preferred embodiments, as described herein, the carbon fiber structure may be previously formed (i.e. may be a rigid laminate structure as described later herein), though the novel structures described and illustrated herein are applicable to use with the carbon fiber structure regardless of how it is formed.

For purposes of the present description and claims, the term "bolt object" will be used to embrace and refer to any of a bolt head (of any shape, such a 4-sided, 6-sided, etc.), a nut for a bolt (which may again have any suitable number of sides or "flats"), or any bolt head like-mechanism, having a plurality of sides which are intended to be engaged to facilitate rotation, or restriction from rotation, of the mechanism.

Referring now to FIG. 1, a block diagram 100 depicting one embodiment of a wrench assembly 105 is shown. In the embodiment of FIG. 1, wrench assembly 105 includes a handle portion 110 and metal inserts 120 and 160. As depicted, wrench assembly 105 is formed from a carbon fiber laminate. The carbon fiber laminate used to form wrench assembly 105 may of varying degrees of thickness (e.g., ¼", ⅜", ½", 3 mm, 6 mm, etc.), although is not limited to these examples. While the described structures are particularly applicable to box-end wrenches, as in the depicted example, the described structure and methods may also be applied to other configurations, such as spanner, combination and ratchet wrenches, though aspects described herein are particularly useful when applied to box-end wrenches.

In some embodiments, the carbon fiber laminate used to form wrench assembly 105 may be cut from a pre-formed sheet of carbon fiber material (e.g., a laminated substrate including carbon fibers). In one embodiment, a sheet of carbon fiber from which wrench assembly 105 is formed is comprised of orthotropic (non quasi-isotropic) laminates utilizing a twill weave at 0°/90°orientation, and may in some examples be a symmetrical and balanced laminate. An example of such material is that sold as "EconomyPlate CF Sheets" by Allred & Associates of Elbridge N.Y. A textured finish may appear on both sides of a carbon fiber sheet used to form a wrench assembly, although the finish applied on one or both sides of the carbon fiber sheet (and wrench assembly) may vary by embodiment. Laminates for such a carbon fiber sheet may be composed entirely of a tough and rigid carbon reinforced epoxy matrix in some embodiments.

Forming handle portion 110 may be accomplished by various cutting means in different embodiments. In one embodiment, a pressurized water tool may be used to cut a carbon fiber sheet to form handle 110 (as well as apertures 115 and 155). In other embodiments, a laser cutting tool or mechanical cutting means may be used. Alternatively, the carbon fiber may be laid up and molded specifically in the form of the handle, through techniques known to those skilled in the art. In some cases, the handle may be laid up and molded around the insert.

As shown, handle 110 includes apertures 115 and 155, which may be of different sizes in various embodiments. Aperture 115, in the embodiment shown, defines a central opening with a plurality of recesses 119 around that central opening, i.e. extending around at least a portion of the periphery of aperture 115. In the embodiment of FIG. 1, aperture 115 is formed in a way that allows metal insert 120 to be secured to handle 110.

Metal insert 120 is formed, in various embodiments, using stainless steel, nickel-chromium, titanium, or any metallurgical combination that would occur to those with skill in the art. In one embodiment, 304 stainless steel may be used to form insert 120. As shown, metal insert 120 has an external periphery that includes a plurality of teeth 117 configured to engage recesses 119 in handle 110. In the embodiment of FIG. 1, metal insert 120 is secured into aperture 115 using an adhesive material (e.g., epoxy), although in other embodiments additional and/or alternative means for securing metal insert 120 may be used. In some preferred examples, the insert will be press-fit into the handle aperture; and in such embodiments the metal insert 120 and aperture 115 are cooperatively sized to provide an interference fit sufficient to maintain load on metal insert 120 within aperture 115, and to thereby provide a frictional fit sufficient to maintain placement of metal insert 120 within aperture 115. In some examples, the surfaces at the exterior of metal insert 120 and/or the surfaces defining aperture 115 may be roughened or otherwise adapted to enhance the frictional fit.

The dimensions of aperture 115 may be generally uniform across the height of the aperture in handle 110 (i.e., along a vertical axis through the center of aperture 115). As a result, aperture 115 may be formed by surfaces that extend generally perpendicular to the nominal plane of handle 110. In the example of wrench 100, where handle 110 exhibits generally flat top and bottom surfaces surrounding aperture 115, the surfaces defining aperture 115 extend generally perpendicular to the upper and lower surfaces of handle 110 proximate aperture 115.

The configuration of metal insert 120 will, in many embodiments, be complementary to the configuration as described for aperture 115, as it will be configured to aperture 155 (for example, using teeth 117). Thus, teeth 117 of metal insert 120, like the remainder of the insert, may be generally uniform in dimension in the direction of a vertical axis through aperture 155, as discussed relative to aperture 115.

The height of metal insert 120 may be substantially the same as the height of handle 110 in one embodiment, while in other embodiments, metal insert 120 may be taller than (i.e., extend beyond) handle 110, or be shorter than handle 110 (so as to be at least to some extent recessed within the thickness of handle 110).

Additionally, while metal inserts 120, 160 in FIG. 1 are shown as having a uniform vertical section, other configurations are envisioned. For example, a radially-extending ledge might be formed at either an uppermost or lowermost extent of either metal insert 120, 160, the ledge configured to engage the adjacent surface of handle 110. Engagement between such a radially-extending edge and handle 110 can either be at the nominal plane of handle 110, or could be within a recess formed within handle 110 to receive the ledge. Other potentially non-uniformities in the vertical section of metal inserts 120, 160 may be implemented as may be deemed useful.

Metal insert 120 is configured to receive and engage a bolt head in the embodiment of FIG. 1. In one embodiment, aperture 115 and teeth 117 define a 12 point pattern for receiving a bolt head, and the exterior peripheral surface of metal insert 120 is configured to engage complimentarily with recesses 119. In other embodiments, different patterns for teeth 117 may be used (e.g., a 6 point or other pattern). Metal insert 120 may also be formed with a generally uniform wall thickness in its lateral direction (i.e., perpendicular to an aperture extend through the center of aperture 115). In such a configuration with a uniform wall thickness, the point pattern within the insert will be found also on the exterior periphery.

Many configurations for the complementary engagement between the insert 120 and the handle may be envisioned. While some form of repeating features around the exterior periphery of the insert will often be desirable, in some embodiments, the repeating features might not extend all around the exterior periphery, but only in selected regions (for example, for some portion of each quadrant around the periphery). Additionally, the exterior periphery of the metal insert will not necessarily have a generally circular contour (as may be considered for the depicted example, as a circle may be drawn through the plurality of teeth extending around the periphery of metal insert 120), but might have, for example, a generally triangular, square, pentagonal, or other multi-sided configuration. One generally continuous exterior configuration that could be used in some examples might be a general oval periphery. The chosen shape will have some contour(s) or feature(s) that will facilitate non-rotating engagement between the insert and the handle. Additionally, while a single-piece (unitary) insert will often be desirable, a multi-element assembly for the insert may also be contemplated. Additionally, in some applications the metal insert could be configured to provide additional functionality, for example, such as providing a ratcheting mechanism between the portion engaging the handle in generally fixed relation, and the portion configured to engage the nut, bolt, etc. The handle will be formed with a contour of the aperture configured to receive and engage the exterior periphery of the insert. In many particularly preferred embodiments, the handle aperture will have a contour complimentary in both size and shape to the exterior periphery of the insert, as in the depicted example.

As shown, handle 110 also includes aperture 155 and metal insert 160. Aperture 155 and metal insert 160 may have substantially the same properties (respectively) as aperture 115 and metal insert 120, but may be smaller or larger in some embodiments. For example, in one embodiment, metal insert 120 may be fit for a ⅜" bolt while metal insert 160 is fit for a 7/16" bolt (in this example, apertures 115 and 155 would also be sized as necessary to accommodate their respective metal inserts). In general, a variety of patterns and sizing may be used for metal insert 120, teeth 117, and/or recesses 119, and may include metric sizes, in some embodiments.

Referring now to FIG. 2, a picture of a set including a plurality of example wrench assemblies 202A-E is shown. The wrench assembly 100 described above relative to FIG. 1 may have some or all of the properties of the wrenches shown in FIG. 2, in various embodiments. Although the pictured example wrenches 202A-E are generally flat, and have a generally rectangular profile if viewed in cross-section, other configurations are contemplated. For example, some wrenches may have handle formations that are other than flat, for example, with a bolt-engaging portion that extend is a first plane, and with a handle portion that extends generally relative to a second plane angularly disposed relative to the first plane, for example at an angle in the general vicinity of 15 degrees relative to that first plane.

Figure 3:
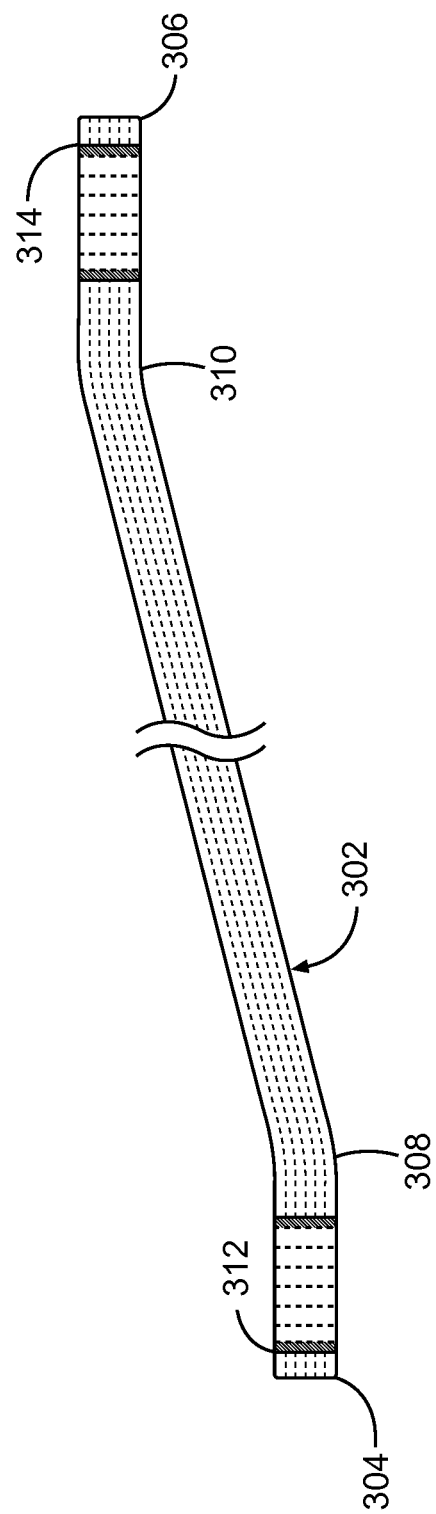
FIG. 3 depicts an alternative configuration of a wrench in accordance with the present invention, wherein the opposing ends of the wrench extend in offset, generally parallel planar relationship to one another.

Referring now to FIG. 3, therein is depicted an example wrench 300 which is not flat (i.e., the opposing ends of the wrench do not lie in a common plane). In wrench 300, a handle 302 extends between first and second engaging sections, indicated generally at 304 and 306. In many examples, the handle 302 will be formed as a single (or "unitary"), component with both engaging sections 304, 306. Each engaging section 304, 306 is configured to facilitate engagement with a bolt object with a respective metal insert 312, 314 of a respective selected size and configuration. Each engaging section includes a respective metal inserts 312, 314 retained within a respective engaging aperture, each of which may be configured in accordance with the various options as described relative to wrench 100 in FIG. 1.

The engaging sections 304, 306 are located at opposite ends of the handle, and therefore also of the wrench 300. A first angle 308 is formed in the structure between handle 302 and engaging section 304, and a second angle 310 is formed in the structure between handle 302 and engaging section 306. The magnitude of each angle 308, 310 may be of any selected size, though in many configurations the angles will be generally equal to one another to provide a useful symmetry to wrench 300. Though the angles may be varied as needed to facilitate ergonomic usage or to facilitate the wrench's configuration for specific applications. The result of first and second angle 308, 310, respectively, is that engaging sections 304 and 306 extend in planes that are parallel but offset from one another. While the two planes do not necessarily have to extend in parallel planes (they could extend in non-parallel, and non-common planes), offset parallel planes is a desirable configuration for many purposes.

As was previously described embodiments, the described configuration of wrench 300 can also be achieved either by individual layup of the handle configuration, or by using a preformed carbon fiber laminate sheet having appropriate formed bends for the desired configuration, from which the wrench handle can be cut, in a manner similar to that described earlier herein. Similarly, the handle portion can have a curved section, for example with a curve along some portion of either the longitudinal axis of the wrench or along the lateral axis of the wrench portion of the wrench. Depending on the curve desired, it may be more practical in some cases to individually lay-up the carbon fiber laminate for each handle than to cut the form from a pre-cured sheet laminate shaped with the desired curve. Additionally, even where a sheet of cured laminate is used as the source for the handle form, the otherwise rectangular cross section of the cut handle can be modified by chamfering or otherwise smoothing any undesired corners of the cut handle.

Although particular features have been described above, additional variations are contemplated, and the invention is not limited to the specific examples that have been set forth herein, but is defined by all of the following claims and all additional claims supported by the present specification, and all equivalents thereof.

What is claimed is:

1. A method of forming a wrench assembly, comprising the steps of:
    forming a handle portion from a composite laminate comprising carbon fibers, including forming a handle aperture in the handle portion, the handle aperture defining a central opening with a plurality of recesses formed around at least a portion of the aperture periphery; and
    securing a metal insert within the handle aperture using an adhesive material, wherein the metal insert is formed by defining an insert aperture configured to receive and engage a selected configuration of a bolt object, the metal insert having an external periphery with a plurality of teeth extending around a least a portion of the external periphery and configured to engage the recesses in the handle.

2. The method of claim 1, wherein the bolt object is selected from either a bolt head or a nut.

3. The method of claim 2, wherein the bolt head or nut has a generally hexagonal peripheral shape.

4. The method of claim 1, wherein the teeth on the metal insert are of generally uniform dimension relative to a vertical and central axis through the aperture of the metal insert.

5. The method of claim 4, wherein the dimensions of the handle aperture are of generally uniform dimension in the direction of an axis extending generally perpendicular to the surfaces defining the handle aperture.

6. The method of claim 1, wherein the dimensions of the handle aperture are of generally uniform dimension in the direction of a vertical axis extending the handle aperture.

7. The method of claim 1, wherein the aperture of the metal insert defines a 12 point pattern for receiving the object, and wherein the exterior peripheral surface of the metal insert defines 12 teeth configured to engage complimentary recesses in the handle aperture.

8. The method of claim 7, wherein the 12 point pattern in the aperture of the metal insert and the 12 teeth on the exterior peripheral surface of the metal insert are achieved in part by forming the metal insert with a generally uniform wall thickness in the lateral direction.

9. The method of claim 1, wherein forming the handle comprises cutting the handle portion from a laminated substrate comprising carbon fibers.

10. A method of forming a wrench assembly, comprising the steps of:
    forming a recess in a handle portion formed from a composite laminate comprising carbon fibers, the handle aperture defining a central opening with a plurality of recesses formed around at least a portion of the aperture periphery; and
    securing a metal insert within the handle aperture, the metal insert is having an insert aperture configured to receive and engage a selected configuration of a bolt object, the metal insert having an external periphery with a plurality of teeth extending around a least a portion of the external periphery, the external periphery configured to engage the recesses in the handle.

11. The method of claim 10, wherein the step of securing a metal insert within the handle aperture comprises securing the metal insert with a press fit with the surfaces defining the handle aperture.

12. The method of claim 10, wherein the step of securing a metal insert within the handle aperture comprises adhesively coupling the metal insert within the handle aperture.

13. The method of claim 10, wherein the handle portion is of a generally elongated form, and where the recess is proximate an end of the elongated form.

14. A wrench assembly comprising,
    a handle portion including a composite laminate comprising carbon fibers, and having at least one aperture, the handle defining the aperture with a non-circular periphery formed around at least a portion of the aperture; and
    a metal insert within the handle aperture the metal insert defining an insert aperture configured to receive and engage a bolt head, the metal insert having an external periphery configured to engage the non-circular handle aperture.

15. The wrench assembly of claim 14, further comprising a bonding material securing the metal insert within the handle aperture.

16. The wrench assembly of claim 14, wherein the metal insert includes a plurality of teeth extending around a least a portion of the external periphery of the insert, and wherein the handle aperture comprises a plurality of recesses configured to receive and engage the teeth.

* * * * *